United States Patent [19]

Faugeras et al.

[11] 3,996,099
[45] Dec. 7, 1976

[54] LOW TEMPERATURE STEAM GENERATOR

[75] Inventors: Pierre Faugeras, Versailles; Alfred Lecocq, Bures-sur-Yvette; Jean-Louis Romet, Paris, all of France

[73] Assignee: Commissariat a l'Energie Atomique, Paris, France

[22] Filed: Dec. 30, 1975

[21] Appl. No.: 645,371

[30]  Foreign Application Priority Data

Jan. 3, 1975  France ............................. 75.00129

[52] U.S. Cl. .................................. 176/49; 176/65; 165/104 F; 122/4 D
[51] Int. Cl.$^2$ ........................................ G21C 15/00
[58] Field of Search ......................... 176/49, 65, 45; 165/104 P; 122/4 D

[56]  References Cited

UNITED STATES PATENTS 3,494,829  2/1970  Mialki et al. .......................... 176/49

FOREIGN PATENTS OR APPLICATIONS 835,266  5/1960  United Kingdom ................. 176/65

Primary Examiner—Harvey E. Behrend
Attorney, Agent, or Firm—Cameron, Kerkam, Sutton, Stowell & Stowell

[57]  ABSTRACT

The low-temperature steam generator consists of a single enclosure containing a molten-salt reactor and a fluidized-bed exchanger located above the reactor core and inserted in the molten-salt circuit. The molten salt is circulated within the primary tube elements while water is circulated within the secondary tube elements and is discharged in the form of steam. The two banks of tube elements are immersed in a particle bed which is subjected to agitation by a stream of inert gas.

9 Claims, 1 Drawing Figure

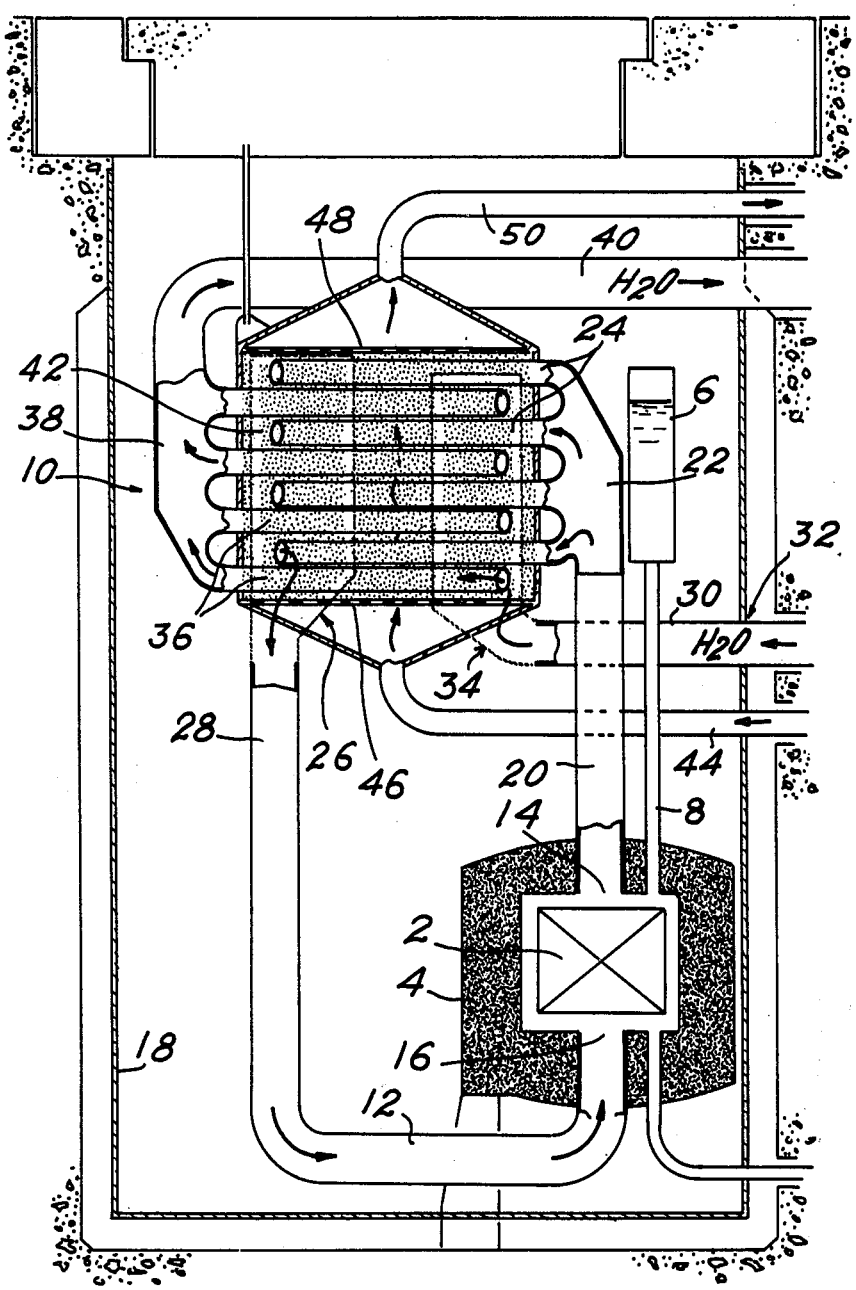

LOW TEMPERATURE STEAM GENERATOR

This invention relates to a low-temperature steam generator and, in more precise terms, to a steam generator which utilizes a low-power nuclear reactor of the molten-salt type.

It is known that a molten-salt reactor can advantageously be employed for the generation of steam. Especially if high power levels are not required, a reactor of this type is of simple design and operation since the molten salt performs the double function of nuclear fuel and heat-transporting fluid and circulates by natural convection.

However, if a heat exchanger of any ordinary type is employed for transferring heat from the molten salt to the cold circuit, the migration of the tritium produced by the fission process and absorbed by the molten salt must be stopped before this latter passes through the heat exchanger. It also proves necessary to guard against the strong potential danger of contamination of the steam circuit by making use of a highly elaborate steel which affords very high corrosion resistance.

The generator which is provided in this invention is precisely intended to overcome the disadvantages mentioned in the foregoing while being of small overall size and offering a high degree of safety.

The low-temperature steam generator essentially comprises within a common enclosure a molten-salt reactor and a fluidized-bed heat exchanger located above the reactor core at one point of its molten-salt circuit, the molten salt being circulated within the primary tube elements of said heat exchanger whilst water is circulated within the secondary tube elements and is discharged in the form of steam, the two banks of tube elements being immersed in a particle bed which is subjected to agitation by a stream of inert gas.

The fact of placing a fluidized-bed heat exchanger at one point of the active circuit of a molten-salt reactor has the advantage of permitting the removal of fission products at the same time as the transfer of heat from the molten salt to the cold steam. Tritium, for example, which is removed during heat transfer by diffusion through the walls of the primary circuit tube elements as the hot molten salt circulates within these latter at high temperature, is immediately entrained by the gas stream which subjects the particle bed of the heat exchanger to agitation.

A slight overpressure of the stream of inert gas which passes through the bed is sufficient to prevent any contamination of the steam circuit in the event, for example, of a rupture in one of the molten-salt tube elements, thus permitting the use of ordinary steel for the steam tubes.

The inherent advantages of a molten-salt reactor can thus be turned to profitable account while simplifying the design of the reactor without any attendant danger by causing this latter to cooperate with a heat exchanger equipped with a fluidized bed.

Furthermore, the assembly resulting from the judicious association of a molten-salt reactor and a fluidized-bed heat exchanger is of small overall size since the thermal properties of the heat-transporting salt make it possible to employ a molten-salt circuit having small dimensions and a heat exchanger which has a small heat-exchange surface area while maintaining a satisfactory level of efficiency.

In order to gain a clearer understanding of the invention, the following description relates to one example of application of the device according to the invention, this example being given without any limitation being implied. Reference is made to the single accompanying figure, which is a vertical sectional view showing diagrammatically the entire low-temperature steam generator in accordance with the present invention. There is shown in this figure the reactor core 2 surrounded by the reflector 4 and connected to an expansion vessel 6 by means of the drain pipe 8.

In accordance with the essential feature of the invention, a fluidized-bed heat exchanger 10 is associated with the closed circuit 12 for the circulation of molten salt, between the point of discharge from the reactor core 2 through the opening 14 and the point of admission to the bottom of the core through the opening 16.

The heat exchanger 10, the molten-salt circuit 12 and the reactor core 2 which is located beneath the heat exchanger 10 are placed within a common heat-insulated enclosure 18.

The vertical duct 20 for the upward flow of the hot salt terminates in a diffuser 22 which ensures the distribution of said salt between the different tube elements such as the element 24 which are placed within the fluidized-bed heat exchanger 10 and constitute the primary circuit of this latter. These heat exchanger tubes open into the manifold 26 and this latter is immediately followed by the vertical duct 28 through which the cold molten salt is returned to the reactor core 2.

A water inlet duct 30 traverses the wall of the enclosure 18 through the orifice 32 and passes into the secondary diffuser 34 of the heat exchanger, said diffuser being followed by tube elements such as the element 36 which constitute the secondary circuit of said exchanger. These secondary tube elements open into the manifold 38 from which extends the steam outlet duct 40. The primary tube elements 24 and secondary tube elements 36 of the heat exchanger 10 are isolated from each other by a particle bed 42 through which a gas stream is circulated. The gas stream inlet pipe 44 penetrates into the heat exchanger at the base of a plate 46 which is pierced with holes for the injection of said gas, at right angles to the primary and secondary tube elements 24 and 36.

A plate 48 which is parallel to the plate 46 serves to discharge the gas to the exterior of the heat exchanger, said gas being then collected in the outlet pipe 50.

A certain number of preferential design conditions may be adopted for the device as hereinabove described in the event that the steam generator is designed for city heating or for industrial steam production.

In this case said generator contains a small reactor having a low power level of the order of 50 MW of heat as well as a heat exchanger having a small heat-exchange surface area. The reactor and heat exchanger are both of small overall size and may correspond, for example, to the characteristics which will be set forth hereinafter.

The molten salt employed can be a mixture of fluorides of lithium, beryllium, uranium and thorium.

The molten-salt circuit can be limited since a difference in height between the reactor core and the heat exchanger ranging from 1.5 m to 6 m is sufficient.

Taking into account the thermal characteristics of the salt, an array of approximately 2500 tube elements having a length of 5 m, for example, is sufficient to ensure effective heat transfer from the molten salt to the steam.

Accordingly, the particle bed is preferably constituted by graphite beads and the inert fluidization gas is helium. The use of a fluidized bed of air with sand would make it necessary to employ a heat exchanger of larger size.

Before explaining the operation of the device in accordance with the invention, it is recalled that a molten-salt reactor operates in a process of natural convection by thermosiphon effect as a result of the substantial variation in density of the salt as a function of the temperature, said salt being employed in the reactor both as fuel and as heat-transporting fluid.

Thus the operation of the device is as follows: the molten salt which is caused to circulate by the heat generated during the fission reaction flows upwards within the vertical duct 20 and transports the heat into the interior of the heat exchanger 10. Within said heat exchanger, the heat stored by the molten salt is transferred to the graphite particle bed 38 and from this latter to the water for subsequent vaporization.

The particle bed which is fluidized by helium is maintained at a constant temperature of approximately 400° C.

The active molten salt is admitted into the heat exchanger at approximately 700° C and discharged therefrom after having released its heat at approximately 500° C whilst the water at an initial temperature of 90° C leaves the heat exchanger in the state of steam at 300° C.

The particle bed which is employed as intermediate fluid in the heat exchanger also serves to trap the tritium which, after being passed by diffusion through the primary tube elements 24 which contain the salt at 700° C, is carried by the helium to the exterior of the generator.

It should be noted that the particle bed in which helium is circulated serves to detect any possible leakage and in this case to prevent contamination of the steam circuit.

At the heat-exchanger outlet, the cooled molten salt returns downwards through the vertical duct 20 to the bottom of the reactor core 2 whilst the heated steam escapes from the generator through the duct 40.

The expansion vessel 6 is a safety device employed at the time of substantial variations in volume of the molten salt.

We claim:

1. A steam generator comprising within a common enclosure a molten-salt nuclear reactor having a reactor core, a fluidized-bed heat exchanger located above the reactor core in said common enclosure, a molten-salt circuit, said reactor core and said heat exchanger being components of said molten-salt circuit, said heat exchanger comprising a vessel having a first bank of primary tubes and a second bank of secondary tubes which are spaced from said primary tubes, said secondary tubes comprising part of a secondary coolant circuit, said molten salt being circulated within the primary tube elements of said heat exchanger whilst water is circulated within the secondary tube elements and is discharged in the form of steam, the two banks of tube elements being immersed in a particle bed means for subjecting said particle bed to agitation by a stream of inert gas wherein heat is transferred from the molten-salt in said primary tubes to the water in said secondary tubes by means of the particles in said bed.

2. A steam generator according to claim 1, wherein the molten salt is constituted by a mixture of fluorides of lithium, beryllium, uranium and thorium.

3. A steam generator according to claim 1, wherein the molten salt is circulated by convection of heat.

4. A steam generator according to claim 1, wherein the fluidized bed is constituted by graphite beads.

5. A steam generator according to claim 1, wherein the stream of inert gas is a stream of helium.

6. A steam generator according to claim 1, wherein the difference in height between the core of the molten-salt reactor and the heat exchanger is preferably in the range of 1.5 m to 6 m approximately.

7. A steam generator according to claim 1, wherein the admission and discharge temperatures of the molten-salt mixture in the heat exchanger are respectively about 700° C and 500° C.

8. A steam generator according to claim 7, wherein the admission temperature of the water and discharge temperature of the steam are respectively about 90° C and 300° C.

9. A steam generator according to claim 7, wherein the particle bed is at a constant temperature of about 400° C.

* * * * *